US012556995B2

(12) United States Patent
Awada et al.

(10) Patent No.: US 12,556,995 B2
(45) Date of Patent: Feb. 17, 2026

(54) PRIORITIZING CONDITIONAL HANDOVER WITH DUAL ACTIVE PROTOCOL STACK

(71) Applicant: Nokia Technologies Oy, Espoo (FI)

(72) Inventors: Ahmad Awada, Munich (DE); Jedrzej Stanczak, Wroclaw (PL); Ömer Bulakci, Munich (DE); Srinivasan Selvaganapathy, Bangalore (IN); Tero Henttonen, Espoo (FI); Amaanat Ali, Espoo (FI)

(73) Assignee: Nokia Technologies Oy, Espoo (FI)

( * ) Notice: Subject to any disclaimer, the term of this patent is extended or adjusted under 35 U.S.C. 154(b) by 429 days.

(21) Appl. No.: 18/003,921

(22) PCT Filed: Jul. 14, 2021

(86) PCT No.: PCT/EP2021/069562
§ 371 (c)(1),
(2) Date: Dec. 30, 2022

(87) PCT Pub. No.: WO2022/037851
PCT Pub. Date: Feb. 24, 2022

(65) Prior Publication Data
US 2023/0354134 A1 Nov. 2, 2023

(30) Foreign Application Priority Data
Aug. 18, 2020 (IN) .............................. 202041035567

(51) Int. Cl.
H04W 36/28 (2009.01)
H04W 36/18 (2009.01)
(52) U.S. Cl.
CPC ......... H04W 36/28 (2013.01); H04W 36/185 (2023.05)
(58) Field of Classification Search
None
See application file for complete search history.

(56) References Cited

U.S. PATENT DOCUMENTS

2012/0172036 A1 7/2012 Bhalla
2020/0022035 A1 1/2020 Kadiri et al.
(Continued)

FOREIGN PATENT DOCUMENTS

CA 3118213 A1 5/2020
WO 2019/134163 A1 7/2019
(Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.
(Continued)

Primary Examiner — Peter P Chau
(74) Attorney, Agent, or Firm — Barta Jones, PLLC

(57) ABSTRACT

An apparatus performs evaluating, with a user equipment of a communication network, before detaching from a source cell a conditional handover execution condition fulfillment for a conditional handover with the user equipment from the source cell to at least one target cell of the communication network; and based on the evaluating, detaching from the source cell for performing the conditional handover to a target cell of the at least one target cell. Further, an apparatus performs sending toward user equipment information comprising a configuration of a conditional handover, wherein the information causes the user equipment to evaluate a conditional handover execution condition fulfillment before detaching from the source cell for at least one target cell based on an indication of the conditional handover execution condition fulfillment to a first target cell of the at least one target cell that does not support a dual active protocol stack configuration.

12 Claims, 6 Drawing Sheets

(56) References Cited

U.S. PATENT DOCUMENTS

| | | | | |
|---|---|---|---|---|
| 2022/0217594 | A1* | 7/2022 | Kim | H04W 36/0085 |
| 2022/0369171 | A1* | 11/2022 | Kim | H04W 36/08 |
| 2023/0030653 | A1* | 2/2023 | Hori | H04W 36/0079 |
| 2023/0037503 | A1* | 2/2023 | Hori | H04W 76/19 |
| 2023/0040867 | A1* | 2/2023 | Hori | H04W 48/20 |
| 2023/0040973 | A1* | 2/2023 | Tsuboi | H04W 12/0431 |
| 2023/0043592 | A1* | 2/2023 | Tsuboi | H04W 36/185 |
| 2023/0171655 | A1* | 6/2023 | Chen | H04W 36/00 370/331 |
| 2023/0262538 | A1* | 8/2023 | Kim | H04W 52/0235 370/331 |

FOREIGN PATENT DOCUMENTS

| | | |
|---|---|---|
| WO | 2019/215666 A1 | 11/2019 |
| WO | 2020/068651 A1 | 4/2020 |
| WO | 2020/088569 A1 | 5/2020 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.1.0, Mar. 2020, pp. 1-386.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

"3rd Generation Partnership Project; Technical Specification Group Radio Access Network; Evolved Universal Terrestrial Radio Access Network (E-UTRAN); X2 application protocol (X2AP) (Release 16)", 3GPP TS 36.423, V16.1.0, Mar. 2020, pp. 1-438.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"Msc-generator", Source Forge, Retrieved on Dec. 22, 2022, Webpage available at : https://sourceforge.net/projects/msc-generator/.

Turanyi, "Msc-generator", Source Forge, version 6.3.0, Jan. 3, 2018, 203 pages.

"3rd Generation Partnership Project; Technical Specification Group Services and System Aspects; Service requirements for cyber-physical control applications in vertical domains; Stage 1 (Release 17)", 3GPP TS 22.104, V17.3.0, Jul. 2020, pp. 1-76.

Invitation to Pay Additional Fees received for corresponding Patent Cooperation Treaty Application No. PCT/EP2021/069562, dated Nov. 3, 2021, 16 pages.

International Search Report and Written Opinion received for corresponding Patent Cooperation Treaty Application No. PCT/EP2021/069562, dated Jan. 3, 2022, 24 pages.

* cited by examiner

PRIORITIZING CONDITIONAL HANDOVER WITH DUAL ACTIVE PROTOCOL STACK

RELATED APPLICATION

This application was originally filed as PCT Application No. PCT/EP2021/069562, filed on 14 Jul. 2021, which claims priority from Indian Provisional Application No. 202041035567, filed on 18 Aug. 2020, each of which is incorporated herein by reference in its entirety.

TECHNICAL FIELD

The teachings in accordance with the exemplary embodiments of this invention relate generally to configuration at a user equipment with CHO execution condition for a CHO handover to a target cell and, more specifically, relate to configuration at a user equipment with CHO execution condition for the user equipment to wait before performing the CHO execution to determine whether another target cell for the CHO execution supports both CHO and DAPS for a CHO handover.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
CHO Conditional Handover
DAPS Dual Active Protocol Stack
DL Downlink
DRB Data Radio Bearer
HO Handover
HOF Handover Failure
LTE Long Term Evolution
NR New Radio
PDCP Packet Data Convergence Protocol
RACH Random Access Channel
RLC Radio Link Control
RLF Radio Link Failure
RSRP Reference Signal Received Power
RSRQ Reference Signal Received Quality
RX Reception
SDU Service Data Unit
SINR Signal-to-Interference Noise Ratio
TX Transmission
UL Uplink Wireless communications systems are widely deployed to provide various types of communication capabilities for devices including user equipment and other network devices using multiple-access systems of a network to communicate with one another. Examples of such multiple-access systems include 4G systems such as Long Term Evolution (LTE) type systems, and 5G systems which may be referred to as New Radio (NR) systems. A wireless multiple-access communications system may include a number of base stations or network access nodes to support these communication devices and systems.

In certain cases, the communication devices such as UE may be required to perform a handover in these multi-access systems. In certain cases, the handover can be a dual active protocol stack handover or a conditional handover. However, there are still issues remaining with these types of handovers in technologies at the time of this application.

Example embodiments of the invention as disclosed herein work to at least address these issues and improve these operations.

SUMMARY

In accordance with an aspect, a method includes evaluating, with a user equipment of a communication network, before detaching from a source cell a conditional handover execution condition fulfillment; wherein the conditional handover execution condition fulfillment is for a conditional handover of the user equipment from the source cell to at least one target cell of the communication network; and based on the evaluating, detaching from the source cell for performing the conditional handover to a target cell of the at least one target cell.

In accordance with an aspect, an apparatus includes means for evaluating, with a user equipment of a communication network, before detaching from a source cell a conditional handover execution condition fulfillment; wherein the conditional handover execution condition fulfillment is for a conditional handover of the user equipment from the source cell to at least one target cell of the communication network; and means for, based on the evaluating, detaching from the source cell for performing the conditional handover to a target cell of the at least one target cell.

In accordance with an aspect, a method includes sending toward a user equipment information comprising a configuration of a conditional handover; wherein the information causes the user equipment to evaluate a conditional handover execution condition fulfillment before detaching from a source cell for at least one target cell; wherein the evaluation is based on an indication of the conditional handover execution condition fulfillment to a first target cell of the at least one target cell that does not support a dual active protocol stack configuration.

In accordance with an aspect, an apparatus includes means for sending toward a user equipment information comprising a configuration of a conditional handover; wherein the information causes the user equipment to evaluate a conditional handover execution condition fulfillment before detaching from a source cell for executing the conditional handover.

In accordance with an aspect, an apparatus includes means for sending toward a user equipment information comprising a configuration of a conditional handover; wherein the information causes the user equipment to evaluate a conditional handover execution condition fulfillment before detaching from a source cell for at least one target cell; wherein the evaluation is based on an indication of the conditional handover execution condition fulfillment to a first target cell of the at least one target cell that does not support a dual active protocol stack configuration.

In accordance with an aspect, an apparatus includes at least one processor; and at least one memory including computer program code; wherein the at least one memory and the computer program code are configured to, with the at least one processor, cause the apparatus at least to: evaluate, with a user equipment of a communication network, before detaching from a source cell a conditional handover execution condition fulfillment; wherein the conditional handover execution condition fulfillment is for a conditional handover of the user equipment from the source cell to at least one target cell of the communication network; and based on the evaluating, detach from the source cell for performing the conditional handover to a target cell of the at least one target cell.

In accordance with an aspect, an apparatus includes at least one processor; and at least one memory including computer program code; wherein the at least one memory and the computer program code are configured to, with the at least one processor, cause the apparatus at least to: send toward a user equipment information comprising a configuration of a conditional handover; wherein the information causes the user equipment to evaluate a conditional handover execution condition fulfillment before detaching from a source cell for at least one target cell; wherein the evaluation is based on an indication of the conditional handover execution condition fulfillment to a first target cell of the at least one target cell that does not support a dual active protocol stack configuration.

In accordance with an aspect, an apparatus includes at least one processor; and at least one memory including computer program code; wherein the at least one memory and the computer program code are configured to, with the at least one processor, cause the apparatus at least to: send toward a user equipment information comprising a configuration of a conditional handover; wherein the information causes the user equipment to evaluate a conditional handover execution condition fulfillment before detaching from a source cell for executing the conditional handover.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In example embodiments of this invention, there is proposed a method and apparatus for configuration at a user equipment with CHO execution condition for the user equipment to wait before performing the CHO execution to determine whether another target cell for the CHO execution supports both CHO and DAPS for a CHO handover.

Example embodiments of the invention address issues related to mobility in a cellular and mobile communication system such as new radio (NR) and Long Term Evolution (LTE). More specifically, it relates to so-called "conditional handover" (CHO) and Dual Active Protocol Stack (DAPS) handover which have been specified for NR and LTE in Rel. 16. CHO aims at improving mobility robustness by reducing the number of radio link failures (RLFs) or handover failures (HOFs), whereas DAPS reduces the interruption time close to 0ms in DL and UL during a handover.

Conditional (CHO) Handover

Figure 1:
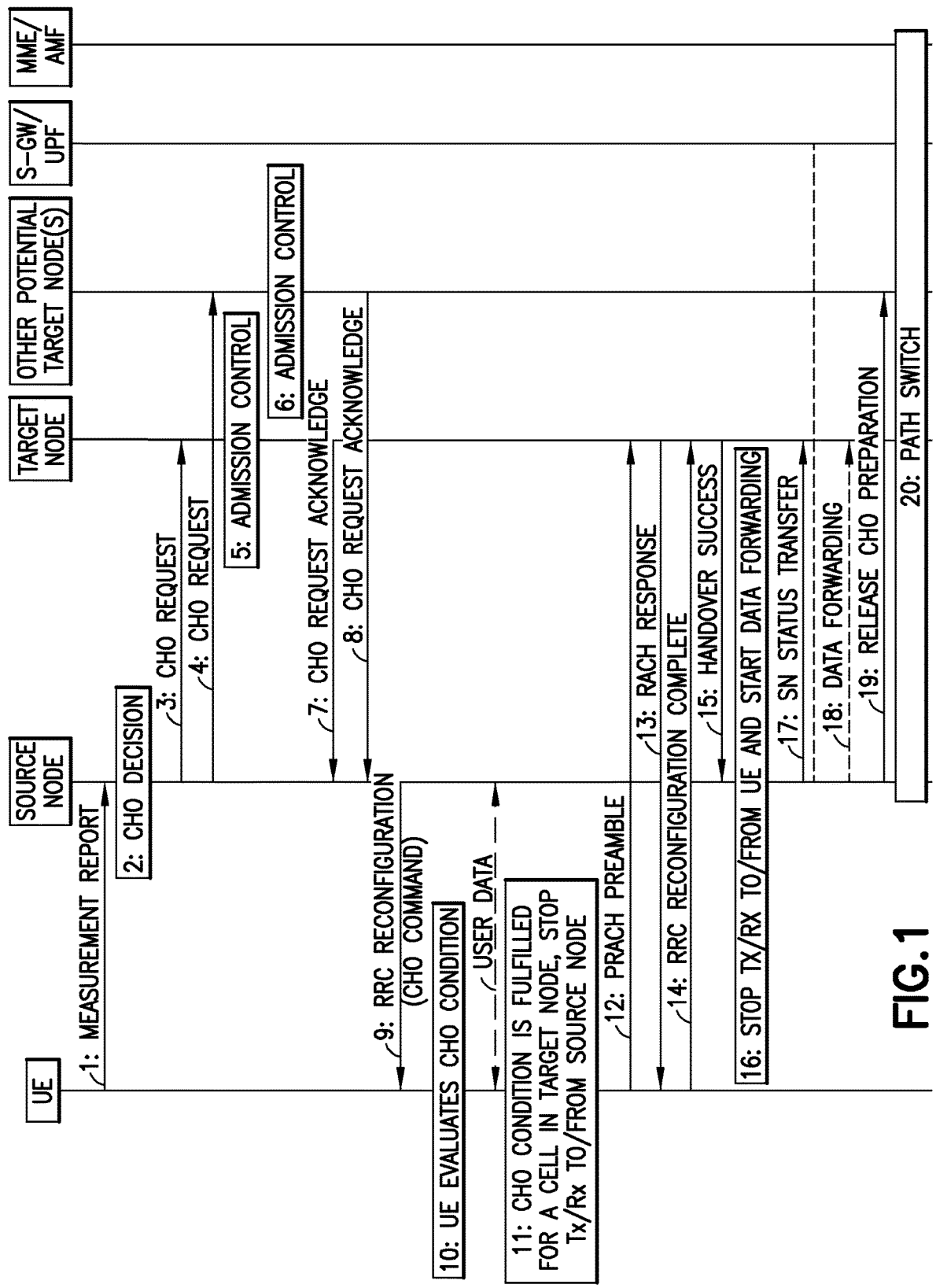
FIG. 1 shows signalling of a conditional (CHO) handover.

FIG. 1 shows operations of a conditional handover. The first steps 1-9 of FIG. 1 are similar to the baseline handover of NR Rel. 15 [TS 38.300]. A configured event triggers the UE to send a measurement report. Based on this report, the source node can prepare one or more target cells for the handover (CHO Request+CHO Request Acknowledge) and then sends an RRC Reconfiguration (CHO command) to the UE.

For baseline handover of NR Rel. 15, the UE will immediately access the target cell to complete the handover. Instead, for CHO, the UE will only access the target cell once an additional CHO execution condition expires (i.e. the HO preparation and execution phases are decoupled). The condition is configured by the source node in HO Command.

Once the UE completes the handover execution to the target cell (e.g. UE has sent RRC Reconfiguration Complete), the target cell sends to the source cell "Handover Success" indication. When receiving this indication from target cell, source cell stops its TX/RX to/from UE and starts data forwarding to target cell in step 18. Moreover, the source may release the CHO preparations in other target nodes/cells (which are no longer needed) when it receives "HO Success" indication.

The advantage of the CHO is that the HO command can be sent very early, when the UE is still safe in the source cell, without risking the access in the target cell and the stability of its radio link. That is conditional handover provides mobility robustness.

Dual Active Protocol Stack (DAPS) Handover

DAPS solution has been introduced in Rel. 16 to achieve close to 0 ms interruption time in downlink (DL) and uplink (UL).

DAPS can be used to perform a handover with reduced interruption time. For DAPS a network device such as a user equipment (UE) continues to send and receive user data in the source cell while a new connection to the target cell is established to enable the device to perform synchronization and random access in a target cell. The mobile terminal will establish a new user plane protocol stack for the target cell, containing PHY (Physical), MAC (Medium Access Control) and RLC (Radio Link Control) layers, while keeping the source user plane protocol stack active for transmission and reception of user data in the source cell.

Figure 2:
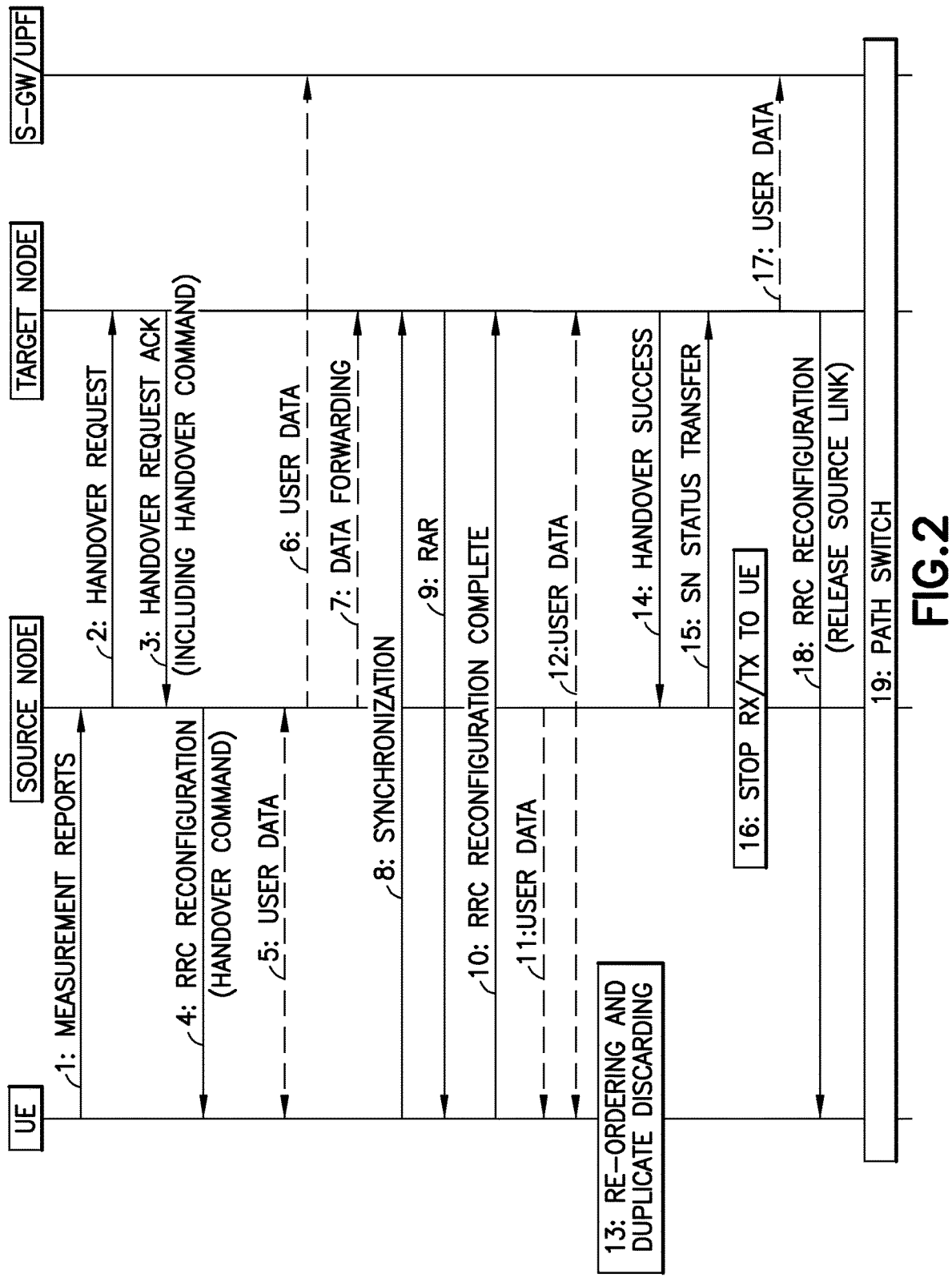
FIG. 2 shows signalling of a Dual Active Protocol Stack (DAPS) handover.

FIG. 2 shows a DAPS signalling flow of a DAPS handover. Herein, each of the source and target cell has full L2 protocol stack with own security key for ciphering and deciphering of the Packet Data Convergence Protocol (PDCP) Service Data Units (SDUs). To avoid a hard handover causing service interruption, the UE should establish a new radio link with respect to the target cell (step 8-10 in FIG. 2) before detaching the radio link of the source cell (step 18 in FIG. 2). That is, for some time before releasing the source cell, the UE would be exchanging data with both source and target nodes (step 11-12).

In DAPS, the UE switches the UL user plane (transmission of new PDCP SDU) to the target cell when random access to the target cell is completed. All other UL signalling, e.g., CSI feedback, PDCP status report, HARQ feedback, continues between the UE and the source cell until it is released.

It has been also specified in Rel. 16 that the target cell of handover may decline the request for DAPS handover and instead falls back to baseline handover. That is the target cell provides target cell configuration for baseline handover rather than for DAPS.

Note that the CHO and DAPS handover procedures are defined for intra-frequency and for inter-frequency scenarios. In the latter scenario, the interference conditions are much more relaxed than in intra-frequency scenario.

The combination of CHO and DAPS solutions would be useful to provide both mobility robustness and interruption time reduction during the handover. This combination has been discussed in Rel. 16 but not specified due to lack of time and is expected to be specified in future 3GPP releases. In addition, it is noted that in the prior art at the time of this application there can be seen problems as will be discussed below.

As such both 1) CHO and 2) CHO with DAPS solutions can co-exist: That is, it may happen that one target cell provides CHO with DAPS configuration whereas another target cell may provide only CHO configuration, e.g., fallback to CHO without DAPS if receiving CHO Request with DAPS. The fallback from CHO with DAPS to CHO is expected to be specified similarly as fall-back from DAPS to baseline handover has been already specified in Rel. 16.

Figure 3:
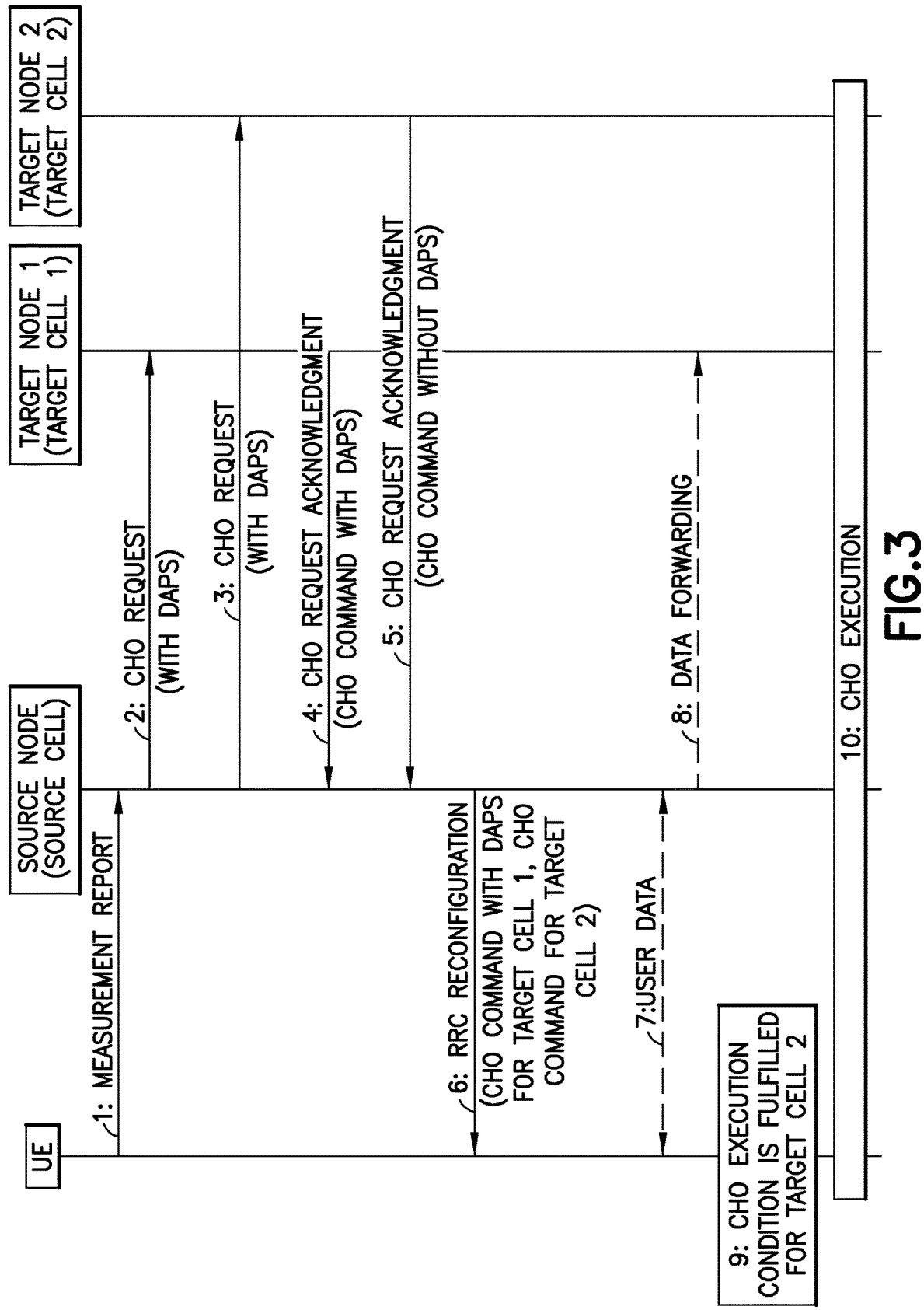
FIG. 3 shows a combination of CHO and DAPS solutions.

One considered scenario is shown in FIG. 3. FIG. 3 shows a combination of CHO and DAPS solutions.

As shown in FIG. 3 there is:

Upon receiving a CHO request for DAPS handover in step 2, the target cell 1 provides a CHO command with DAPS configuration in step 4. Target cell 2 has decided to fall-back to CHO (step 5) upon receiving a request for CHO with DAPS in step 3;

After receiving the CHO commands from the source cell in step 6 for target cell 1 and 2, UE continues to exchange user data with the source cell and evaluates the CHO execution condition provided by the source cell for each target cell in step 6. The source may also initiate data forwarding to target cell 1 supporting DAPS in step 8; and In step 9, the CHO execution is met for target cell 2 that does not support CHO. The UE executes CHO in step 10.

One problem with these operations as shown in FIG. 3 is that for a UE having e.g. URLLC services requiring small outage and high service availability, executing CHO would be harmful as it causes service interruption. In some scenarios, the UE might connect to multiple e.g. target cells 1 and 2 and herein it would be useful if the UE can leverage some of these target cells if prepared with DAPS handover which has much smaller interruption time than CHO.

Further it is noted that there may be two relevant solution approaches for this problem:

Solution Approach 1: Source cell cancels the CHO preparation for cells (e.g. target cell 2 in FIG. 3) not supporting DAPS [e.g., CHO Cancel in TS 36.423, 38.423] and does not configure the UE with their corresponding CHO commands. Herein, the UE can only execute a CHO with DAPS. However, this approach is risky since the relevant/most appropriate target cell of handover may be one of these cells that support only CHO (without DAPS) and failing in configuring the UE with its corresponding CHO command might result in radio link failure (RLF) which has much higher outage than in a successful CHO; and Solution Approach 2: The serving cell configures more relaxed parameters for CHO execution conditions corresponding to target cells supporting DAPS. For instance, the offset Off in e.g. event A3 configured as CHO execution condition, e.g., Measurement of neighboring cell>Measurement of serving cell+Off for Time-to-Trigger (TTT), could be configured smaller for cells supporting DAPS, e.g., target cell 1 of FIG. 3. This approach helps to prioritize target cells that are configured with DAPS over those that are configured solely with CHO. Nevertheless, even with this prioritization, it can still happen that the UE executes CHO to target cell 2 before the condition for target cell 1 is met.

One example embodiment of the invention proposes a method that can be performed by an apparatus where a UE, that is configured with at least one target cell supporting CHO with DAPS, does not detach from the source cell when the CHO execution condition is met for a target cell that supports only CHO, but rather continues to evaluate CHO execution conditions for some pre-defined time duration as long as the radio link of the source cell is still sufficient for radio communication. If within this time duration, a CHO execution condition is met for target cell that supports CHO with DAPS, the UE executes the DAPS HO. Otherwise, the UE executes CHO to the target cell whose CHO execution condition has been already met.

Figure 5:
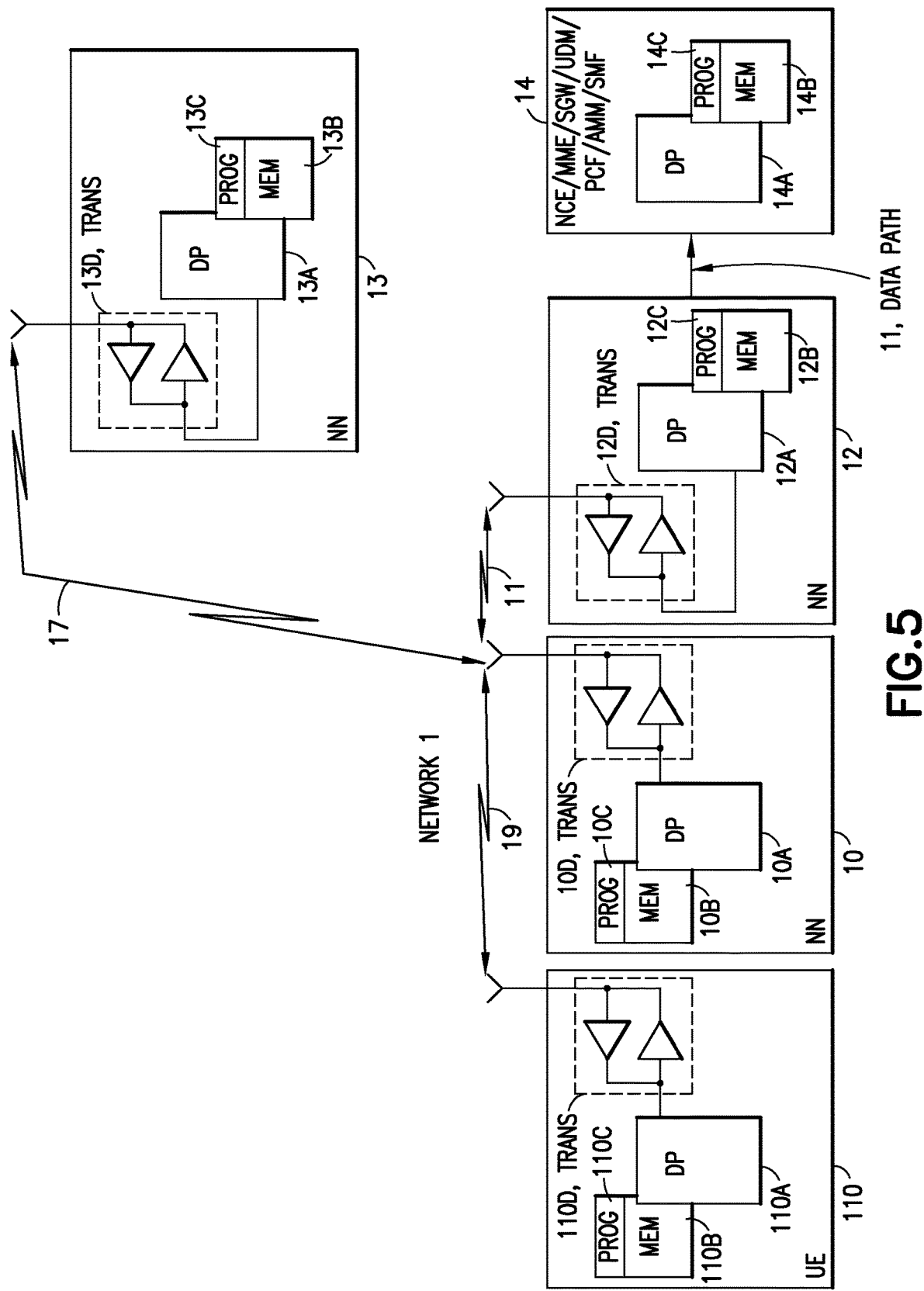
FIG. 5 shows a high level block diagram of various devices used in carrying out various aspects of the invention.

Before describing the example embodiments of the invention in detail, reference is made to FIG. 5 for illustrating a simplified block diagram of various electronic devices that are suitable for use in practicing the example embodiments of this invention.

FIG. 5 shows a block diagram of one possible and non-limiting exemplary system in which the example embodiments of the invention may be practiced. In FIG. 5, a user equipment (UE) 110 is in wireless communication with a wireless network 1. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 110 includes one or more processors DP 110A, one or more memories MEM 110B, and one or more transceivers TRANS 110D interconnected through one or more buses. Each of the one or more transceivers TRANS 110D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 110D are connected to one or more antennas for communication to NN 10 for communication with NN 12 and NN 13. The one or more memories MEM 110B include computer program code PROG 110C. The UE 110 communicates with NN 10 via a wireless link such as the link 19.

The NN 10 (NR/5G Node B, an evolved NB, or LTE device) is a network node such as a master or secondary node base station (e.g., for NR or LTE long term evolution) that communicates with devices such as NN 12 and UE 110 of FIG. 5. The NN 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 17 to NN 12 and NN 13, respectively. The one or more memories MEM 10B include computer program code PROG 10C. The NN 10 communicates with NN 12 and/or NN 13 via a wireless link 11 and/or wireless link 17.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 5. The NN 12 provides access to wireless devices such as the UE 110 to the wireless network 1. The NN 12 includes one or more processors DP 12A, one or more memories MEM 12B, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 and link 19 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13. Further, the link 11, the link 19, and or any other link may be wired or wireless or both and may implement, e.g., an X2 or Xn interface. Further the link 11 or link 19 may be through other network devices such as, but not limited to an NCE/SGW/AMF/UPF device such as the NCE/MME/SGW/UDM/PCF/AMM/SMF 14 of FIG. 5. The NN 12 may perform functionalities of an MME (Mobility Management Entity) or SGW (Serving Gateway), such as a User Plane Functionality, and/or an Access Management functionality for LTE and similar functionality for 5G.

The NN 13 can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1, such as via the data path 11 or a wireless link such as link 17 and/or link 19. The NN 13 includes one or more processors DP 13A, one or more memories MEM 13B, one or more network interfaces, and one or more transceivers TRANS 13D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 and the UE 10 or any other device using, e.g., link 19, link 17, or another link. These links maybe wired or wireless or both and may implement, e.g., an X2 or Xn interface. Further, as stated above the link 17 may be through other network devices such as, but not limited to an NCE/MME/SGW device such as the NCE/MME/SGW/UDM/PCF/AMM/SMF 14 of FIG. 5.

The one or more buses of the device of FIG. 5 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and the one or more buses could be implemented in part as fiber optic cable to connect the other elements of the NN 12 to a RRH.

It is noted that although FIG. 5 shows network nodes such as NN 12 and NN 13, any of these nodes may can incorporate or be incorporated into an eNodeB or eNB or gNB such as for LTE and NR, and would still be configurable to perform example embodiments of the invention.

Also, it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a NCE/MME/SGW/UDM/PCF/AMM/SMF 14 that may include (NCE) network control element functionality, and/or MME (Mobility Management Entity), and/or SGW (Serving Gateway) functionality, and/or user data management functionality (UDM), and/or PCF (Policy Control) functionality, and/or Access and Mobility Management (AMM) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF 14 is configurable to perform operations in accordance with example embodiments of the invention in any of an LTE, NR, 5G and/or any standards based communication technologies being performed or discussed at the time of this application. In addition, it is noted that the operations in accordance with example embodiments of the invention, as performed by the NN 12 and/or NN 13, may also be performed at the NCE/MME/SGW/UDM/PCF/AMM/SMF 14.

The NCE/MME/SGW/UDM/PCF/AMM/SMF 14 includes one or more processors DP 14A, one or more memories MEM 14B, and one or more network interfaces (N/W I/F(s)), interconnected through one or more buses. In accordance with the example embodiments these network interfaces can include X2 and/or Xn interfaces for use to perform the example embodiments of the invention. The one or more memories MEM 14B include computer program code PROG 14C. The one or more memories MEM 14B and the computer program code PROG 14C are configured to, with the one or more processors DP 14A, cause the NCE/MME/SGW/UDM/PCF/AMM/SMF 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, NN 10, NN 12, NN 13, and other functions as described herein.

As similarly stated above an example embodiment of the invention proposes a method that can be performed by an apparatus where a UE, that is configured with at least one target cell supporting CHO with DAPS, does not detach from the source cell when the CHO execution condition is met for a target cell that supports only CHO, but rather continues to evaluate CHO execution conditions for some pre-defined time duration as long as the radio link of the source cell is still sufficient for radio communication. If within this time duration, a CHO execution condition is met for target cell that supports CHO with DAPS, the UE executes the DAPS HO. Otherwise, the UE executes CHO to the target cell whose CHO execution condition has been already met.

Implementation details for this method in accordance with the example embodiments include the following.

Figure 4:
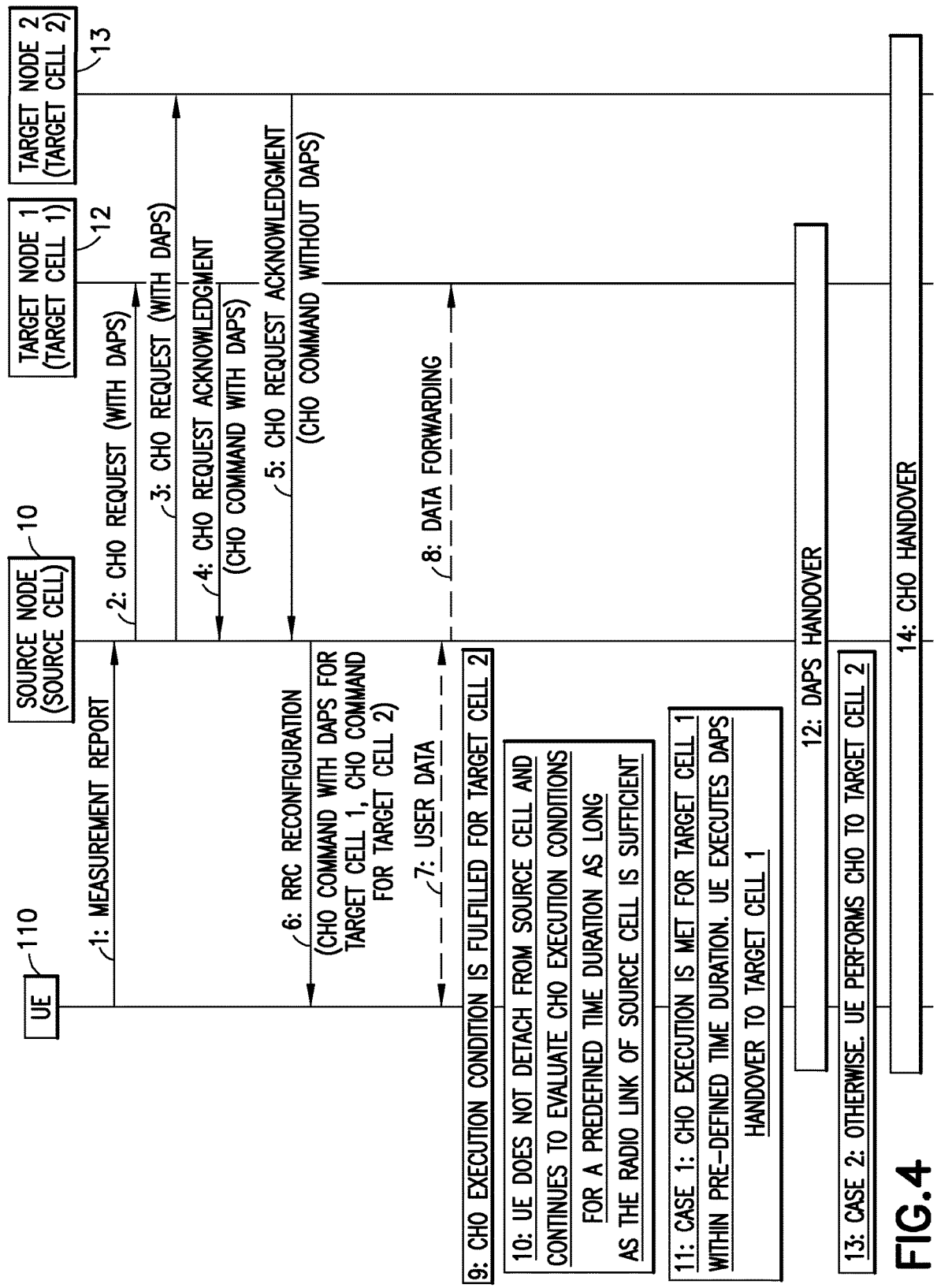
FIG. 4 shows an exemplary implementation of the method in accordance with example embodiments of the invention.

FIG. 4 shows an exemplary implementation of the proposed method. Novel aspects in accordance with example embodiments of the invention are shown in FIG. 4 as underlined, e.g., steps 10, 11, and 13.

In the following paragraphs, there is listed the embodiments that are relevant for the proposed method in accordance with the example embodiments.

In one embodiment, the UE does not detach from source cell in step 10 if TTT of the CHO execution condition is running for another target cell (e.g. target cell 1) that supports DAPS. If TTT expires, the UE executes DAPS handover to e.g. target cell 1, otherwise if TTT is stopped the UE executes CHO to target cell 2 that has previously met the execution condition.

In another embodiment, the UE does not detach from source cell in step 10 if TTT of the CHO execution condition was running before for another target cell (e.g. target cell 1) that supports DAPS. Herein, the UE waits for another time duration T. If within time duration T, the CHO execution condition for target cell 1 supporting DAPS is met, UE performs DAPS handover, Otherwise, the UE performs CHO execution to target cell 2.

In another embodiment, the UE starts time duration T when the CHO execution condition is met for target cell that supports CHO alone (irrespective if TTT was/is running for another target cell supporting DAPS). If within time duration T, the CHO execution condition for target cell 1 supporting DAPS is met, UE performs DAPS handover, Otherwise, the UE performs CHO execution to target cell 2.

In still another embodiment, the UE may start the time duration when the CHO execution condition is met if the survival time (ST) headroom (remaining buffer for allowed outage before the survival time expires) is not large enough to survive the interruption caused/potentially to be caused by CHO, e.g., ST headroom>threshold which can be configured by network. In such a case, the UE may prefer to execute DAPS HO. The ST can be defined as in 3GPP TS 22.104 as "The maximum survival time indicates the time period the communication service may not meet the application's requirement before there is a failure such that the communication service is deemed to be in an unavailable state" and "The time that an application consuming a communication service may continue without an anticipated message." Accordingly, the ST can be inferred as the time or number of continuous packet losses or packets missing the arrival within required time budget for given traffic flow. Beyond this limit the receiver of the traffic may, e.g., shut down the receiver operation due to safety measures. An access node may be informed about the ST via the ST information in the time sensitive communications (TSC) assistance information (TSCAI) per QoS flow, which can be provided from the core network (e.g., 5G core network) to the (R)AN. For example, the ST information can be obtained via the application function (AF) and can be provided to the session management function (SMF). The ST can be utilized by RAN to handle the QoS requirements of a service. The ST can be service dependent and can vary, e.g., in the order of 2× transfer interval value where transfer interval is 5 ms for cooperative carrying use case.

In accordance with example embodiments of the invention, if multiple services associated with STs are running and these services have different ST headrooms, the UE may use 1) smallest ST headroom or 2) the ST headroom of the service with the highest priority (indicated by the network) to decide on the start of the time duration.

In accordance with example embodiments of the invention, UE performs CHO execution condition to the target cell not supporting DAPS after waiting for some pre-defined time duration only if the measurement of the target still fulfils the entering condition or did not meet the leaving condition.

In accordance with example embodiments of the invention, the UE performs CHO execution to the target cell not supporting DAPS while waiting for some pre-defined time duration if the radio link of the source cell is deemed to be insufficient.

In accordance with example embodiments of the invention, the radio link of the source cell is deemed to be sufficient, e.g., if:

Beam failure is not detected, and/or;
Timer T310 or timer T312 for RLF detection is not running and/or;
Signal strength (e.g. RSRP), signal quality (RSRQ), or SINR of the source link is greater than a threshold:
The threshold is provided by the source cell or target cell in step 6 or in system information of the source cell;

No out-of-sync indications are reported by the physical layer; and/or

There are no pending RLC re-transmissions/Random Access re-transmissions/or Scheduling Requests for the source cell.

In another embodiment, the UE may prioritize target cell supporting DAPS, e.g., target cell 1, over target cell not supporting DAPS, e.g., target cell 2 when the CHO execution condition is met for both cells.

In still another embodiment, the UE may prioritize target cell 1 over target cell 3 (both cells supporting CHO with DAPS) when the CHO execution condition is met for both cells. The prioritized cell (Cell ID) or the priority of the cell may be indicated by the network, i.e., UE selects the cell with highest priority for CHO and DAPS handover.

In one embodiment, target cell 1 may be prioritized when the signal strength/quality of target cell 1 is not weaker than that of the strongest target cell by offset W that could be indicated by the network or specified in the UE.

In yet another embodiment, target cell 1 can be prioritized when its signal strength/quality is greater than threshold that is indicated by the network.

Figure 6A:
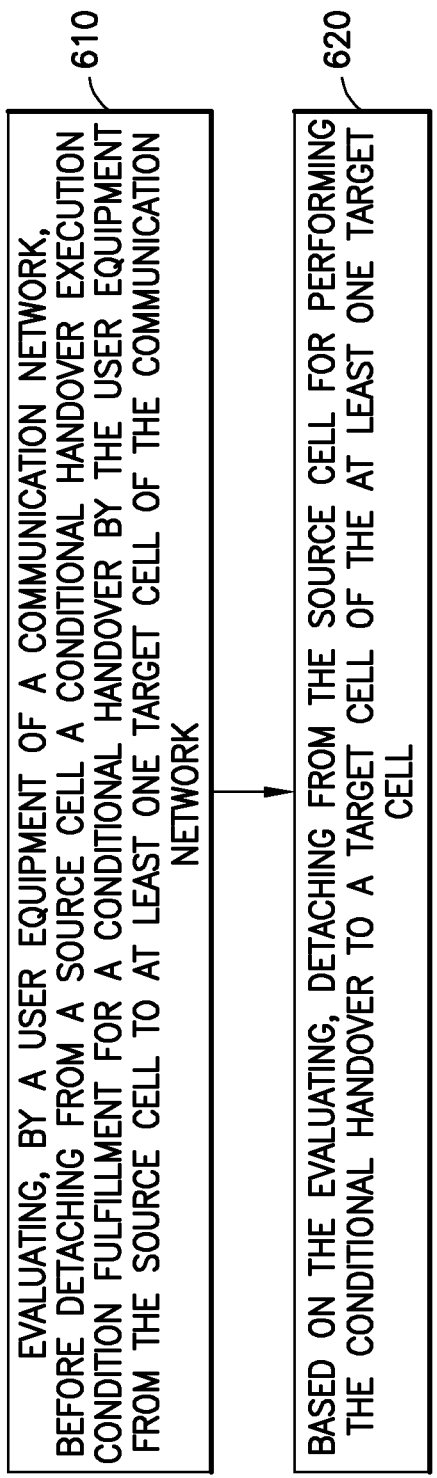
FIG. 6A and FIG. 6B each shows a method in accordance with example embodiments of the invention which may be performed by an apparatus.

FIG. 6A illustrates operations which may be performed by a network device such as, but not limited to, a UE 110 as in FIG. 5. As shown in step 610 of FIG. 6A there is evaluating, by a user equipment of a communication network, before detaching from a source cell a conditional handover execution condition fulfillment for a conditional handover by the user equipment from the source cell to at least one target cell of the communication network. Then as shown in step 620 of FIG. 6A there is based on the evaluating, detaching from the source cell for performing the conditional handover to a target cell of the at least one target cell.

In accordance with the example embodiments as described in the paragraph above, wherein the evaluating comprises starting at least one time duration for evaluating the conditional handover execution condition fulfillment for a conditional handover by the user equipment.

In accordance with the example embodiments as described in the paragraphs above, wherein starting the at least one time duration is based on an indication of the conditional handover execution condition fulfillment to a first target cell of the at least one target cell.

In accordance with the example embodiments as described in the paragraphs above, wherein the evaluating comprises determining that another target cell of the at least one target cell does support a dual active protocol stack configuration; and based on the determining, at the conditional handover execution condition fulfillment of the another target cell executing a dual active protocol stack configuration handover for the conditional handover to the another target cell that supports the dual active protocol stack configuration.

In accordance with the example embodiments as described in the paragraphs above, wherein the evaluating comprises identifying a time duration for the evaluating, wherein if within the time duration the conditional handover execution condition fulfillment for the another target cell is met the user equipment performs a conditional handover to the another target cell.

In accordance with the example embodiments as described in the paragraphs above, wherein executing the dual active protocol stack configuration handover for the conditional handover is performed while a time duration of the at least one time duration has not expired.

In accordance with the example embodiments as described in the paragraphs above, wherein the at least one time duration is started if another timer for the time-to-trigger was running for another target cell that supports the dual active protocol stack configuration.

In accordance with the example embodiments as described in the paragraphs above, wherein the at least one time duration is started based on an indication of the conditional handover execution condition fulfillment and based on determining that a survival time headroom not being large enough for an interruption caused by the conditional handover.

In accordance with the example embodiments as described in the paragraphs above, wherein determining the survival time headroom not being large enough is based on a threshold configured by the communication network.

In accordance with the example embodiments as described in the paragraphs above, wherein the evaluating comprises identifying that the first target cell does not support a dual active protocol stack configuration.

In accordance with the example embodiments as described in the paragraphs above, there is at an expiration of a time duration of the at least one time duration executing the conditional handover to the first target cell.

In accordance with the example embodiments as described in the paragraphs above, wherein the executing is performed after a pre-defined time duration based on a measurement of the first target cell fulfilling an entering condition or not meeting a leaving condition.

In accordance with the example embodiments as described in the paragraphs above, wherein the executing is performed after a pre-defined time duration only if a radio link to the source cell is sufficient for communication with the user equipment.

In accordance with the example embodiments as described in the paragraphs above, wherein the radio link to the source cell is deemed to be sufficient based on at least one of: a beam failure is not detected, a timer T310 or a timer T312 for radio link failure is not running, a first timer or a second timer for radio link failure is not running, wherein the first timer starts upon detecting physical layer problems for a primary cell and stops upon receiving consecutive in-sync indications from lower layers for the primary cell, and wherein the second timer starts upon triggering a measurement report for measurement identity and stops upon receiving consecutive in-sync indications from the lower layers, at least one of a signal strength, a signal quality, or a signal-to-interference noise ratio of a source link with the source cell being greater than a threshold, no out-of-sync indications reported by a physical layer, or no at least one of pending radio link control re-transmissions or random access re-transmissions, or scheduling requests for the source cell.

In accordance with the example embodiments as described in the paragraphs above, wherein the threshold is provided by at least one of the at least one target cell or the source cell.

In accordance with the example embodiments as described in the paragraphs above, wherein the threshold is provided in system information of the source cell.

In accordance with the example embodiments as described in the paragraphs above, wherein the evaluating comprises prioritizing one target cell of the at least one target cell over another target cell of the at least one target cell for the conditional handover.

In accordance with the example embodiments as described in the paragraphs above, wherein the prioritizing is based on determining that the conditional handover execution condition fulfillment is met for both the one target cell and the another target cell of the at least one target cell.

In accordance with the example embodiments as described in the paragraphs above, wherein the prioritizing is based on determining that none of the one target cell or the another target cell support dual active protocol stack configuration.

In accordance with the example embodiments as described in the paragraphs above, wherein the prioritizing is based on determining that both the one target cell or the another target cell support dual active protocol stack configuration, and there is selecting, by the user equipment, one of the one target cell or the another target cell of the at least one target cell for the conditional handover using the dual protocol stack configuration based on a highest priority indication.

In accordance with the example embodiments as described in the paragraphs above, wherein the prioritizing is based on a signal strength and signal quality of each of the at least one target cell.

A non-transitory computer-readable medium (MEM 110B as in FIG. 5) storing program code (PROG 110C as in FIG. 5), the program code executed by at least one processor (DP 110A as in FIG. 5) to perform the operations as at least described in the paragraphs above.

In accordance with an example embodiment of the invention as described above there is an apparatus comprising: means for evaluating (Trans 110D; MEM 110B; PROG 110C; and DP 110A as in FIG. 5), by a user equipment (UE 110 as in FIG. 5) of a communication network 1 (as in FIG. 5), before detaching (Trans 110D; MEM 110B; PROG 110C; and DP 110A as in FIG. 5) from a source cell a conditional handover execution condition fulfillment for a conditional handover by the user equipment from the source cell to at least one target cell of the communication network; and means for, based on the evaluating, detaching (Trans 110D; MEM 110B; PROG 110C; and DP 110A as in FIG. 5) from the source cell for performing the conditional handover to a target cell of the at least one target cell.

In the example aspect of the invention according to the paragraph above, wherein at least the means for evaluating and detaching comprises a non-transitory computer readable medium [MEM 110B as in FIG. 5] encoded with a computer program [PROG 110C as in FIG. 5] executable by at least one processor [DP 110A as in FIG. 5].

Figure 6B:
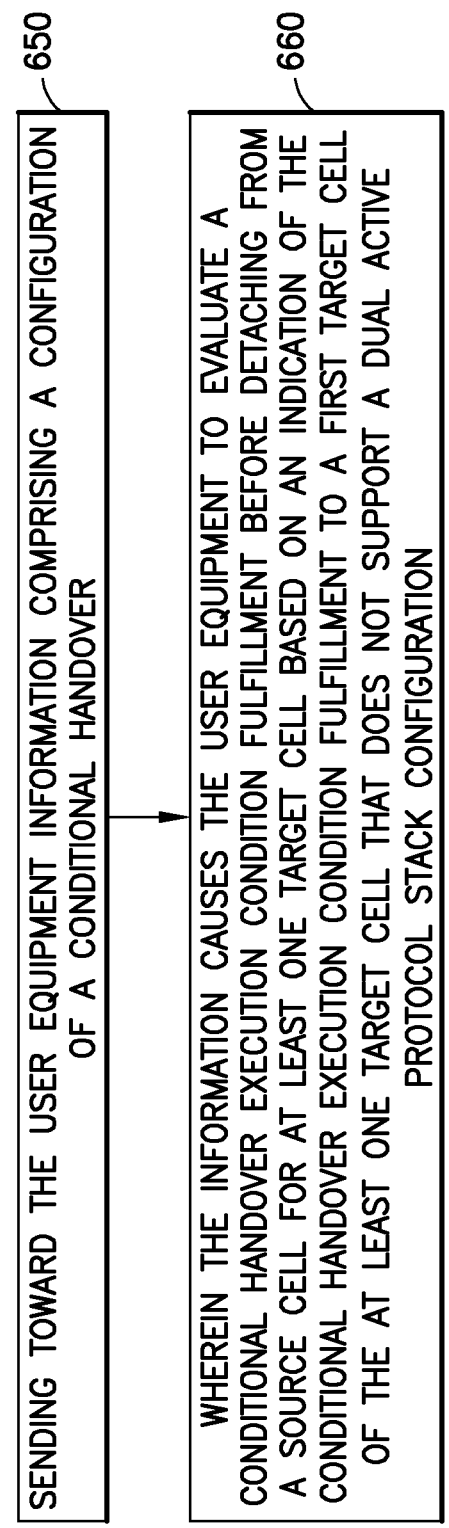

FIG. 6B illustrates operations which may be performed by a network device such as, but not limited to, a NN 10, NN 12, and/or NN 13 as in FIG. 5. As shown in step 650 of FIG. 6B there is sending toward user equipment information comprising a configuration of a conditional handover. Then as shown in step 660 of FIG. 6B there is wherein the information causes the user equipment to evaluate a conditional handover execution condition fulfillment before detaching from a source cell for at least one target cell based on an indication of the conditional handover execution condition fulfillment to a first target cell of the at least one target cell that does not support a dual active protocol stack configuration.

In accordance with the example embodiments as described in the paragraph above, wherein the evaluating comprises starting at least one time duration for evaluating the conditional handover execution condition fulfillment for a conditional handover by the user equipment.

In accordance with the example embodiments as described in the paragraphs above, wherein the evaluating comprises determining whether a target cell of the at least one target cell does support a dual active protocol stack configuration.

In accordance with the example embodiments as described in the paragraphs above, wherein the at least one time duration is started based on the indication and based on a determination by the user equipment that a survival time headroom is not large enough for an interruption caused by the conditional handover.

In accordance with the example embodiments as described in the paragraphs above, wherein determining the survival time headroom not being large enough is based on a threshold configured by the communication network.

In accordance with the example embodiments as described in the paragraphs above, wherein the executing (execution of the handover) is to be performed after a pre-defined time duration based on a measurement of the at least one target cell fulfilling an entering condition or not meeting a leaving condition.

In accordance with the example embodiments as described in the paragraphs above, wherein the executing (execution of the handover) is to be performed after a pre-defined time duration only if a radio link to the source cell is sufficient for communication with the user equipment.

In accordance with the example embodiments as described in the paragraphs above, wherein the radio link to the source cell is deemed to be sufficient based on at least one of: a beam failure is not detected, a timer T310 or a timer T312 for radio link failure is not running, a first timer or a second timer for radio link failure is not running, wherein the first timer starts upon detecting physical layer problems for a primary cell and stops upon receiving consecutive in-sync indications from lower layers for the primary cell, and wherein the second timer starts upon triggering a measurement report for measurement identity and stops upon receiving consecutive in-sync indications from the lower layers, at least one of a signal strength, a signal quality, or a signal-to-interference noise ratio of a source link with the source cell being greater than a threshold, no out-of-sync indications reported by a physical layer, or no at least one of pending radio link control re-transmissions or random access re-transmissions, or scheduling requests for the source cell.

In accordance with the example embodiments as described in the paragraphs above, wherein the threshold is provided by at least one of the at least one target cell or the source cell.

In accordance with the example embodiments as described in the paragraphs above, wherein the threshold is provided in system information of the source cell.

In accordance with the example embodiments as described in the paragraphs above, wherein the evaluating comprises prioritizing one target cell of the at least one target cell over another target cell of the at least one target cell for the conditional handover.

In accordance with the example embodiments as described in the paragraphs above, wherein the prioritizing is based on determining that the conditional handover execution condition fulfillment is met for both the one target cell and the another target cell of the at least one target cell.

In accordance with the example embodiments as described in the paragraphs above, wherein the prioritizing is based on determining that none of the one target cell or the another target cell support dual active protocol stack configuration.

In accordance with the example embodiments as described in the paragraphs above, wherein the prioritizing is based on determining that a target cell of the at least one target cell supports a dual active protocol stack configuration.

In accordance with the example embodiments as described in the paragraphs above, wherein the prioritizing is based on a signal strength and signal quality of each of the at least one target cell.

A non-transitory computer-readable medium (MEM 10B, MEM 12B, and/or MEM 13B as in FIG. 5) as in FIG. 5) storing program code (PROG 10C, PROG 12C, and/or PROG 13C as in FIG. 5), the program code executed by at least one processor (DP 10A, DP 12A, and/or DP 13A as in FIG. 5) to perform the operations as at least described in the paragraphs above.

In accordance with an example embodiment of the invention as described above there is an apparatus comprising: means for sending (MEM 10B, MEM 12B, and/or MEM 13B; PROG 10C, PROG 12C, and/or PROG 13C; and DP 10A, DP 12A, and/or DP 13A as in FIG. 5) toward the user equipment information comprising a configuration of the conditional handover, wherein the information causes the user equipment to evaluate the conditional handover execution condition fulfillment before detaching from the source cell for executing the conditional handover.

In the example aspect of the invention according to the paragraph above, wherein at least the means for sending comprises a non-transitory computer readable medium [MEM 10B, MEM 12B, and/or MEM 13B as in FIG. 5] encoded with a computer program [PROG 10C, PROG 12C, and/or PROG 13C as in FIG. 5] executable by at least one processor [DP 10A, DP 12A, and/or DP 13A as in FIG. 5].

In accordance with an example embodiment of the invention as described above there is an apparatus comprising: means for sending (MEM 10B, MEM 12B, and/or MEM 13B; PROG 10C, PROG 12C, and/or PROG 13C; and DP 10A, DP 12A, and/or DP 13A as in FIG. 5) toward a user equipment information comprising a configuration of a conditional handover, wherein the information causes the user equipment to evaluate a conditional handover execution condition fulfillment before detaching from a source cell for at least one target cell based on an indication of the conditional handover execution condition fulfillment to a first target cell of the at least one target cell that does not support a dual active protocol stack configuration.

In the example aspect of the invention according to the paragraph above, wherein at least the means for sending comprises a non-transitory computer readable medium [MEM 10B, MEM 12B, and/or MEM 13B as in FIG. 5] encoded with a computer program [PROG 10C, PROG 12C, and/or PROG 13C as in FIG. 5] executable by at least one processor [DP 10A, DP 12A, and/or DP 13A as in FIG. 5].

In accordance with an example embodiment of the invention as described above there is an apparatus comprising: at least one processor [DP 10A, DP 12A, and/or DP 13A as in FIG. 5]; and at least one non-transitory or transitory memory [MEM 10B, MEM 12B, and/or MEM 13B as in FIG. 5] including computer program code [PROG 10C, PROG 12C, and/or PROG 13C as in FIG. 5]; wherein the at least one memory and the computer program code are configured to, with the at least one processor, cause the apparatus at least to: evaluate, with a user equipment of a communication network, before detaching from a source cell a conditional handover execution condition fulfillment; wherein the conditional handover execution condition fulfillment is for a conditional handover of the user equipment from the source cell to at least one target cell of the communication network; and based on the evaluating, detach from the source cell for performing the conditional handover to a target cell of the at least one target cell.

In accordance with an example embodiment of the invention as described above there is an apparatus comprising: at least one processor [DP 10A, DP 12A, and/or DP 13A as in FIG. 5]; and at least one non-transitory or transitory memory [MEM 10B, MEM 12B, and/or MEM 13B as in FIG. 5] including computer program code [PROG 10C, PROG 12C, and/or PROG 13C as in FIG. 5]; wherein the at least one memory and the computer program code are configured to, with the at least one processor, cause the apparatus at least to: send toward a user equipment information comprising a configuration of a conditional handover; wherein the information causes the user equipment to evaluate a conditional handover execution condition fulfillment before detaching from a source cell for at least one target cell; wherein the evaluation is based on an indication of the conditional handover execution condition fulfillment to a first target cell of the at least one target cell that does not support a dual active protocol stack configuration.

In accordance with an example embodiment of the invention as described above there is an apparatus comprising: at least one processor [DP 10A, DP 12A, and/or DP 13A as in FIG. 5]; and at least one non-transitory or transitory memory [MEM 10B, MEM 12B, and/or MEM 13B as in FIG. 5] including computer program code [PROG 10C, PROG 12C, and/or PROG 13C as in FIG. 5]; wherein the at least one memory and the computer program code are configured to, with the at least one processor, cause the apparatus at least to: send toward a user equipment information comprising a configuration of a conditional handover; wherein the information causes the user equipment to evaluate a conditional handover execution condition fulfillment before detaching from a source cell for executing the conditional handover.

ADVANTAGES

It is noted that advantages of example embodiments of the invention as described herein include at least:
 Provides a device such as a user equipment having services requiring small outage the opportunity to perform CHO+DAPS instead of CHO without risking the radio link of the serving cell; and
 A performance of DAPS does not cause service interruption which is relevant for URLLC or similarly demanding services.

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:
(a) hardware-only circuit implementations (such as implementations in only analog and/or digital circuitry);
(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
(c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:
(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus, comprising:
at least one processor; and
at least one memory including computer program code;
wherein the at least one memory and the computer program code are configured to, with the at least one processor, cause the apparatus at least to:
  evaluate, before detaching from a source cell, a conditional handover execution condition fulfillment, wherein the conditional handover execution condition fulfillment is for a conditional handover of the apparatus from the source cell to at least one target cell, and wherein the evaluating comprises:
    based on an indication of the conditional handover execution condition fulfillment to a first target cell of the at least one target cell and based on determining that a survival time headroom is not large enough for an interruption caused with the conditional handover, starting at least one time duration for the evaluating the conditional handover execution condition fulfillment for the conditional handover of the apparatus; and at an expiration of a time duration of the at least one time duration, executing the conditional handover to the first target cell based on identifying that the first target cell does not support a dual active protocol stack configuration, wherein the executing is performed after a pre-defined time duration only when a radio link to the source cell is sufficient for communication with the apparatus, wherein the radio link to the source cell is deemed to be sufficient based on the following: a beam failure is not detected and a first timer or a second timer for radio link failure is not running, wherein the first timer starts upon detecting physical layer problems for a primary cell and stops upon receiving consecutive in-sync indications from lower layers for the primary cell, and wherein the second timer starts upon triggering a measurement report for measurement identity and stops upon receiving consecutive in-sync indications from the lower layers, a signal strength, a signal quality, and a signal-to-interference noise ratio of a source link with the source cell being greater than a threshold, no out-of-sync indications reported with a physical layer, and no pending radio link control re-transmissions, no random access re-transmissions, and no scheduling requests for the source cell; and based on the evaluating, detach from the source cell for performing the conditional handover to the first target cell of the at least one target cell.

2. The apparatus of claim 1, wherein the threshold is provided with by at least one of the at least one target cell or the source cell.

3. The apparatus of claim 1, wherein the threshold is provided in system information of the source cell.

4. The apparatus of claim 3, wherein the determining that the survival time headroom is not large enough is based on a threshold configured with a communication network.

5. The apparatus of claim 4, wherein the evaluating further comprises prioritizing one target cell of the at least one target cell over another target cell of the at least one target cell for the conditional handover.

6. The apparatus of claim 5, wherein the prioritizing is based on determining that the conditional handover execution condition fulfillment is met for both the one target cell and the another target cell of the at least one target cell; or wherein the prioritizing is based on determining that none of the one target cell or the another target cell support dual active protocol stack configuration.

7. A system comprising:
an apparatus;
at least one processor; and
at least one memory including computer program code, wherein the at least one memory and the computer program code are configured to, with the at least one processor, cause the apparatus at least to:
evaluate, before detaching from a source cell, a conditional handover execution condition fulfillment, wherein the conditional handover execution condition fulfillment is for a conditional handover of the apparatus from the source cell to at least one target cell, and wherein the evaluating comprises:
based on an indication of the conditional handover execution condition fulfillment to a first target cell of the at least one target cell and based on determining that a survival time headroom is not large enough for an interruption caused with the conditional handover, starting at least one time duration for the evaluating the conditional handover execution condition fulfillment for the conditional handover of the apparatus; and
at an expiration of a time duration of the at least one time duration, executing the conditional handover to the first target cell based on identifying that the first target cell does not support a dual active protocol stack configuration, wherein the executing is performed after a pre-defined time duration only when a radio link to the source cell is sufficient for communication with the apparatus, wherein the radio link to the source cell is deemed to be sufficient based on the following: a beam failure is not detected and a first timer or a second timer for radio link failure is not running, wherein the first timer starts upon detecting physical layer problems for a primary cell and stops upon receiving consecutive in-sync indications from lower layers for the primary cell, and wherein the second timer starts upon triggering a measurement report for measurement identity and stops upon receiving consecutive in-sync indications from the lower layers, a signal strength, a signal quality, and a signal-to-interference noise ratio of a source link with the source cell being greater than a threshold, no out-of-sync indications reported with a physical layer, and no pending radio link control re-transmissions, no random access re-transmissions, and no scheduling requests for the source cell; and based on the evaluating, detach from the source cell for performing the conditional handover to the first target cell of the at least one target cell.

8. The system of claim 7, wherein the evaluating further comprises prioritizing one target cell of the at least one target cell over another target cell of the at least one target cell for the conditional handover.

9. The system of claim 8, wherein the prioritizing is based on determining that the conditional handover execution condition fulfillment is met for both the one target cell and the another target cell of the at least one target cell; or wherein the prioritizing is based on determining that none of the one target cell or the another target cell support dual active protocol stack configuration.

10. A method comprising:
evaluating, by an apparatus, before detaching from a source cell, a conditional handover execution condition fulfillment, wherein the conditional handover execution condition fulfillment is for a conditional handover of the apparatus from the source cell to at least one target cell, and wherein the evaluating comprises:
based on an indication of the conditional handover execution condition fulfillment to a first target cell of the at least one target cell and based on determining that a survival time headroom is not large enough for an interruption caused with the conditional handover, starting at least one time duration for the evaluating the conditional handover execution condition fulfillment for the conditional handover of the apparatus;
at an expiration of a time duration of the at least one time duration, executing the conditional handover to the first target cell based on identifying that the first target cell does not support a dual active protocol stack configuration, wherein the executing is performed after a pre-defined time duration only when a radio link to the source cell is sufficient for communication with the apparatus, wherein the radio link to the source cell is deemed to be sufficient based on the following: a beam failure is not detected and a first timer or a second timer for radio link failure is not running, wherein the first timer starts upon detecting physical layer problems for a primary cell and stops upon receiving consecutive in-sync indications from lower layers for the primary cell, and wherein the second timer starts upon triggering a measurement report for measurement identity and stops upon receiving consecutive in-sync indications from the lower layers, a signal strength, a signal quality, and a signal-to-interference noise ratio of a source link with the source cell being greater than a threshold, no out-of-sync indications reported with a physical layer, and no pending radio link control re-transmissions, no random access re-transmissions, and no scheduling requests for the source cell; and based on the evaluating, detaching from the source cell for performing the conditional handover to the first target cell of the at least one target cell.

11. The method of claim 10, wherein the evaluating further comprises prioritizing one target cell of the at least one target cell over another target cell of the at least one target cell for the conditional handover.

12. The method of claim 11, wherein the prioritizing is based on determining that the conditional handover execution condition fulfillment is met for both the one target cell and the another target cell of the at least one target cell; or wherein the prioritizing is based on determining that none of the one target cell or the another target cell support dual active protocol stack configuration.

* * * * *